US009073544B2

(12) United States Patent
Whitney et al.

(10) Patent No.: US 9,073,544 B2
(45) Date of Patent: Jul. 7, 2015

(54) CONTROL ARCHITECTURE FOR A MULTI-MODE POWERTRAIN SYSTEM

(71) Applicant: GM GLOBAL TECHNOLOGY OPERATIONS LLC, Detroit, MI (US)

(72) Inventors: Christopher E. Whitney, Commerce, MI (US); Anthony H. Heap, Ann Arbor, MI (US); Sean W. McGrogan, Ann Arbor, MI (US); Kiana Whitehead, Romulus, MI (US); Michael Livshiz, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/890,670

(22) Filed: May 9, 2013

(65) Prior Publication Data

US 2013/0325233 A1 Dec. 5, 2013

Related U.S. Application Data

(60) Provisional application No. 61/654,528, filed on Jun. 1, 2012.

(51) Int. Cl.
*B60W 20/00* (2006.01)
*B60K 6/445* (2007.10)
*B60K 6/52* (2007.10)
*B60K 23/08* (2006.01)
*B60W 10/06* (2006.01)
*B60W 10/08* (2006.01)

(52) U.S. Cl.
CPC ........... *B60W 20/108* (2013.01); *Y10S 903/902* (2013.01); *B60K 6/445* (2013.01); *B60K 6/52* (2013.01); *B60K 23/0808* (2013.01); *B60W 10/06* (2013.01); *B60W 10/08* (2013.01); *B60W 2710/0666* (2013.01); *B60W 2710/083* (2013.01); *Y02T 10/6286* (2013.01); *Y02T 10/6239* (2013.01); *Y02T 10/6265* (2013.01)

(58) Field of Classification Search
None
See application file for complete search history.

(56) References Cited

U.S. PATENT DOCUMENTS

| | | | | |
|---|---|---|---|---|
| 5,803,197 | A * | 9/1998 | Hara et al. | 180/248 |
| 6,319,168 | B1 * | 11/2001 | Morris et al. | 477/5 |
| 7,747,363 | B1 * | 6/2010 | Tang | 701/22 |
| 2002/0163251 | A1 * | 11/2002 | Crombez et al. | 303/152 |
| 2003/0080615 | A1 * | 5/2003 | Riddiford et al. | 303/155 |
| 2005/0022769 | A1 * | 2/2005 | Kuze et al. | 123/142.5 R |
| 2005/0060079 | A1 * | 3/2005 | Phillips et al. | 701/53 |
| 2008/0045382 | A1 * | 2/2008 | Kawasaki et al. | 477/115 |
| 2008/0287255 | A1 * | 11/2008 | Snyder | 477/110 |

(Continued)

*Primary Examiner* — John R Olszewski
*Assistant Examiner* — Nicholas K Wiltey

(57) ABSTRACT

A controller architecture for a vehicle including a multi-mode powertrain system includes an engine controller having a control routine for determining and executing engine torque commands responsive to a hybrid engine torque command, and a control routine for determining a propulsion axle torque command responsive to an output torque request. The controller architecture further includes transmission controller having a control routine for selecting and effecting operation of the passive transmission in a preferred gear responsive to the output torque request. The controller architecture further includes a hybrid controller having control routines for determining and executing torque commands for each of the non-combustion torque machines and for determining the hybrid engine torque command to achieve a desired axle torque in response to the propulsion axle torque command with the passive transmission operating in the preferred gear.

6 Claims, 4 Drawing Sheets

(56) References Cited

U.S. PATENT DOCUMENTS

| | | | |
|---|---|---|---|
| 2009/0037073 A1* | 2/2009 | Jung et al. | 701/101 |
| 2009/0111640 A1* | 4/2009 | Buur et al. | 477/3 |
| 2010/0106354 A1* | 4/2010 | Fauvel et al. | 701/22 |
| 2011/0257854 A1* | 10/2011 | Whitney et al. | 701/54 |

\* cited by examiner

CONTROL ARCHITECTURE FOR A MULTI-MODE POWERTRAIN SYSTEM

CROSS REFERENCE TO RELATED APPLICATIONS

This application claims the benefit of U.S. Provisional Application No. 61/654,528 filed on Jun. 1, 2012 which is incorporated herein by reference.

TECHNICAL FIELD

This disclosure is related to controls for powertrain systems.

BACKGROUND

The statements in this section merely provide background information related to the present disclosure. Accordingly, such statements are not intended to constitute an admission of prior art.

A control architecture is an arrangement of control modules and executable control routines that are configured to effect a plurality of tasks to determine operational commands for actuators of a system to achieve a desired output in response to operator inputs and commands taking into account operating conditions and capabilities of the actuators. The delegated tasks are preferably executed by control routines providing the desired functions.

SUMMARY

A controller architecture for a vehicle including a multi-mode powertrain system includes an engine controller having a control routine for determining and executing engine torque commands responsive to a hybrid engine torque command, and a control routine for determining a propulsion axle torque command responsive to an output torque request. The controller architecture further includes transmission controller having a control routine for selecting and effecting operation of the passive transmission in a preferred gear responsive to the output torque request. The controller architecture further includes a hybrid controller having control routines for determining and executing torque commands for each of the non-combustion torque machines and for determining the hybrid engine torque command to achieve a desired axle torque in response to the propulsion axle torque command with the passive transmission operating in the preferred gear.

BRIEF DESCRIPTION OF THE DRAWINGS

One or more embodiments will now be described, by way of example, with reference to the accompanying drawings, in which.

DETAILED DESCRIPTION

Figure 1:
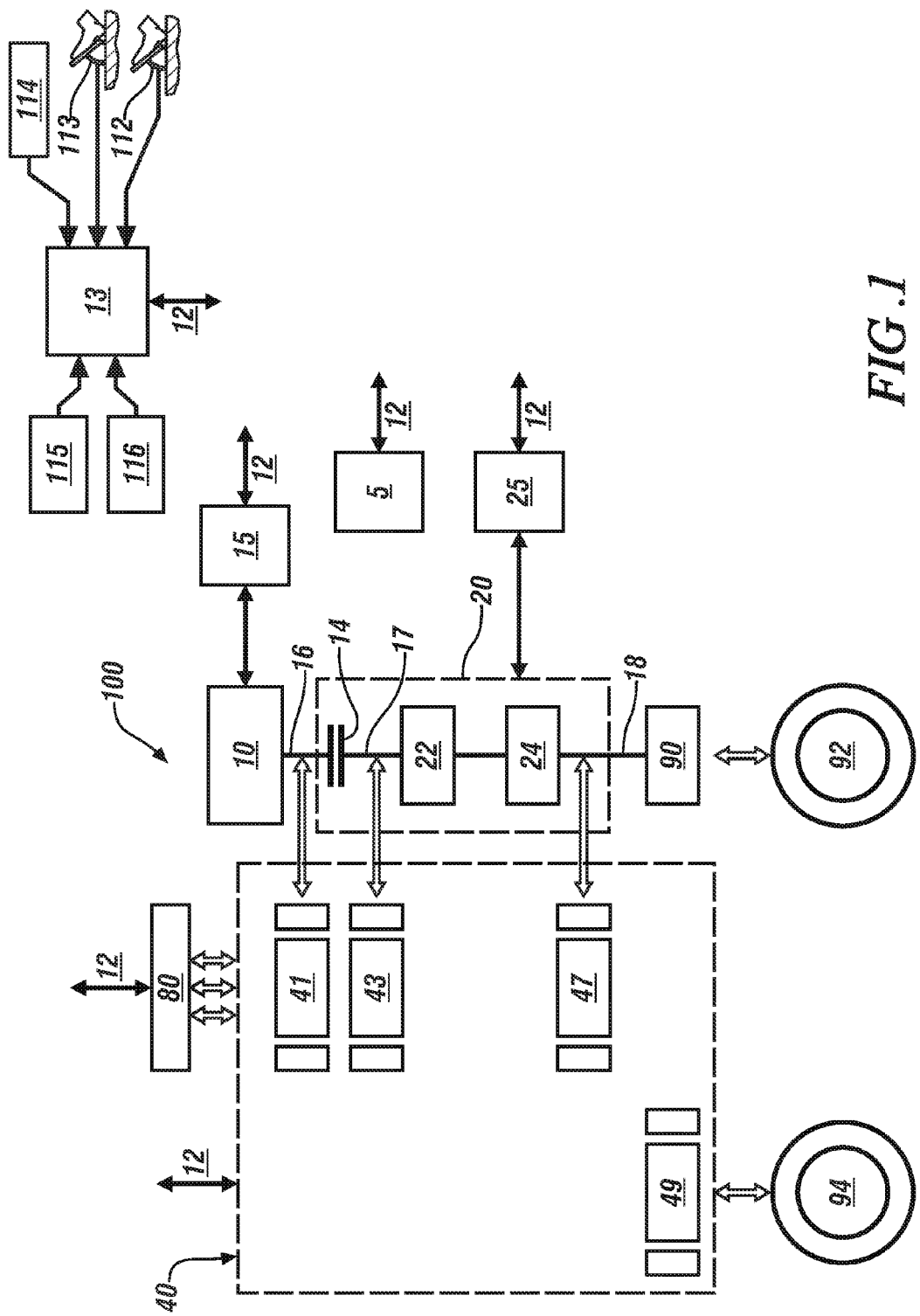
FIG. 1 illustrates a multi-mode powertrain system employing a power-split configuration including an internal combustion engine, non-combustion torque machine(s), a passive transmission, and a non-combustion power system, in accordance with the disclosure.

Referring now to the drawings, wherein the showings are for the purpose of illustrating certain exemplary embodiments only and not for the purpose of limiting the same, FIG. 1 depicts a multi-mode powertrain system 100 employing a power-split configuration including an internal combustion engine (engine) 10, non-combustion torque machine(s) 40, a passive transmission 20, and a non-combustion power system 80. In one embodiment the multi-mode powertrain system 100 mechanically couples to a driveline 90 to propel a vehicle. Preferred controllers for controlling operation of the multi-mode powertrain system 100 include a supervisory control module (HCP) 5, an engine control module (ECM) 15, and a transmission control module (TCM) 25. The preferred controllers are elements of an axle torque control architecture 200 that is described with reference to FIGS. 2, 3, 4, and 5. Delegated tasks for the multi-mode powertrain system 100 include commanding and achieving axle torque(s) responsive to an output torque request.

The passive transmission 20 mechanically couples to the engine 10 and the torque machine(s) 40 and is configured to transfer torque among the engine 10, the torque machine(s) 40, and the driveline 90. In one embodiment the torque machine(s) 40 are electric motor/generators and the non-combustion power system 80 is a high-voltage electrical system 80. Alternate non-combustion power systems may be employed with similar effect, such non-combustion power systems including, e.g., pneumatic power systems, hydraulic power systems, and mechanical power systems. FIG. 1 illustrates alternate arrangements for the powertrain system 100 employing the internal combustion engine 10 and torque machine(s) 40 as propulsion devices that provide propulsion torque to the driveline 90 including primary drive wheels 92 and secondary drive wheels 94. The engine 10 and torque machine(s) 40 are configured to transfer torque to an engine crankshaft 16, a single input member 17 of the transmission 20, a single output member 18 of the transmission 20 and, in one embodiment the secondary drive wheels 94. The non-combustion torque machine(s) 40 includes one or more of the torque machines 41, 43, 47 and 49. The driveline 90 includes the primary drive wheels 92 that mechanically couple via differential gearing, a transaxle or another suitable device to an output member of the transmission 20, and the secondary drive wheels 94 that may couple to one of the torque machine(s) 40, e.g., torque machine 49. The non-combustion torque machine(s) 40 generate propulsion torque and regenerative braking torque in response to an output torque request.

The engine 10 can be any suitable internal combustion device that transforms heat energy contained in fuel to torque, and may be a multi-cylinder spark-ignition or compression-ignition internal combustion engine that is operative in one of a plurality of states to transfer torque to the passive transmission 20 via the engine crankshaft 16 coupled via a mechanical interface device 14 to the single input member 17. The engine 10 is preferably configured to execute autostop, autostart and deceleration fuel cutoff (dFCO) operations during ongoing powertrain operation in response to operating conditions. Engine output including speed and torque can be controlled by controlling actuators to control combustion parameters which may include intake mass airflow, fuel mass and injection timing, spark-ignition timing, EGR, intake and/or exhaust valve timing and phasing, and cylinder deactivation. The engine 10 mechanically couples to the transmission 20 via the mechanical interface device 14, which includes a torque converter including a torque converter clutch device in one embodiment.

The non-combustion torque machine(s) 40, including one or more of torque machines 41, 43, 47 and 49, are multi-phase AC motor/generators in one embodiment, each including a stator and a rotor that employ electric energy to generate or react torque to provide propulsion torque and regenerative braking torque.

The passive transmission 20 is a fixed-ratio mechanical device having a single input member 17 and a single output member 18 and differential gears 22 and 24, and is configured to transfer torque among the engine 10, the torque machine(s) 40, and the driveline 90 in one of a plurality of fixed-gear states. The passive transmission 20 is referred to herein as passive because it does not incorporate torque-generative devices that generate propulsion torque, e.g., electric machines. Each fixed-gear state includes a ratio of transmission input speed to transmission output speed. Fixed-gear ratios have graduated steps that decrease from a relatively large value to a relatively small value with increasing fixed-gear state from a low gear to a higher gear, including an overdrive state(s) wherein the transmission output speed is greater than the transmission input speed. The passive transmission 20 may be configured as an automatic transmission to automatically shift between the fixed-gear ratio states using a predetermined control routine. Alternatively, the passive transmission 20 may be configured as a manual transmission that manually shifts between the fixed-gear ratio states in response to an operator-initiated shift request that may include manipulation of a shift lever and a clutch pedal. Alternatively, the passive transmission 20 may be configured as a continuously-variable transmission having a single input member and a single output member that transfers torque among the engine 10, the torque machine(s) 40, and the driveline 90 in a continuously variable ratio that is controllable.

The powertrain system 100 employs one or more of the torque machines 41, 43, 47 and 49. In embodiments employing the first torque machine P1 41, it mechanically couples to and turns with a crankshaft of the engine 10. The mechanical coupling may include a belt drive coupling (BAS) or a direct drive coupling (FAS). In embodiments employing the second torque machine P2 43, it mechanically couples to and turns with an input member 17 of the passive transmission 20, including coupling to a gear member of a differential gear set thereof. In embodiments employing the third torque machine P3 47, it mechanically couples to and turns with the output member 18 of the passive transmission 20, including coupling to a gear member of a differential gear set thereof. In embodiments employing the fourth torque machine P4 49, it mechanically couples to and turns with the secondary drive wheels 94.

The powertrain system 100 may employ a single one of the torque machine(s) 40, i.e., one of the torque machines 41, 43, 47 and 49. In one embodiment, only the first torque machine P1 41 is employed. The powertrain system 100 may employ combinations of the torque machine(s) 40, i.e., combinations of the torque machines 41, 43, 47 and 49. In one embodiment, the first torque machine P1 41 is employed in combination with the second torque machine P2 43. In one embodiment, the first torque machine P1 41 is employed in combination with the third torque machine P3 47. In one embodiment, the first torque machine P1 41 is employed in combination with the fourth torque machine P4 49, in what is referred to as a P1/P4 powertrain arrangement. Other suitable combinations of the torque machines 41, 43, 47 and 49 may be employed.

The high-voltage electrical system 80 includes an electrical energy storage device (ESD) electrically coupled to an inverter module via a high-voltage bus. The inverter module transfers electric power between the ESD and the torque machine(s) 40 in response to controller-initiated commands. The high-voltage electrical system 80 include suitable devices for monitoring electric power flow including current and voltage monitoring systems. The ESD can be any suitable high-voltage electrical energy storage device, e.g., a high-voltage battery, and preferably includes a monitoring system that provides a measure of electrical power supplied to the high-voltage bus, including voltage and current. The ESD couples to the inverter module via a high voltage bus that preferably include a contactor switch that permits or prohibits flow of electric current between the ESD and the inverter module. The inverter module preferably includes power inverters and respective motor control modules configured to receive torque commands and control inverter states therefrom for providing propulsion torque or regenerative braking torque functionality to meet the motor torque commands. The power inverters include complementary multi-phase power electronics devices, and each includes suitable control circuits including power transistors, e.g., IGBTs for transforming high-voltage DC electric power to high-voltage AC electric power and transforming high-voltage AC electric power to high-voltage DC electric power. The power inverters preferably employ pulse width-modulating (PWM) control to convert stored DC electric power originating in the ESD to AC electric power to drive the torque machine(s) 40 to generate torque. Similarly, the power inverters convert mechanical power transferred to the torque machine(s) 40 to DC electric power to generate electric energy that is storable in the ESD, including as part of a regenerative control strategy. It is appreciated that the power inverter is configured to receive motor control commands and control inverter states to provide the motor drive and regeneration functionality. The inverter module transfers electrical power to and from the torque machine(s) 40 through the power inverters and respective motor control modules in response to the motor torque commands. Electrical current is transmitted across the high-voltage bus to charge and discharge the ESD.

The HCP 5, the ECM 15 and the TCM 25 signally and operatively link to various sensors and actuators in the powertrain system 100 via a communications link 12 to monitor and control operation, including synthesizing inputs and executing algorithms to control actuators to meet control objectives related to fuel economy, emissions, performance, drivability, and protection of hardware, including batteries of ESD and the torque machine(s) 40. The HCP 5, the ECM 15 and the TCM 25 are a subset of overall vehicle control architecture, and provide coordinated system control of the powertrain system as elements of the axle torque control architecture 200. A user interface 13 signally connects to a plurality of devices through which a vehicle operator provides inputs to direct and command operation of the powertrain system. Vehicle operator inputs are preferably provided via an accelerator pedal command 112, brake pedal command 113, transmission range command 114, vehicle speed cruise control command 115, and clutch pedal command 116 when the passive transmission 20 is configured as a manual transmission. The transmission range command 114 may have a discrete number of operator-selectable positions (PRNDL). Alternatively, the transmission range command 114 may include a gear shift device configured with a plurality of operator-selectable forward and reverse gears that is operator-manipulable. The user interface 13 may include a single device, as shown, or alternatively may include a plurality of user interface devices directly connected to individual control modules.

The aforementioned control modules communicate with other control modules, sensors, and actuators via the communications link 12, which effects structured communication between the various control modules. The specific communication protocol is application-specific. The communications link 12 executes protocols that provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Figure 2:
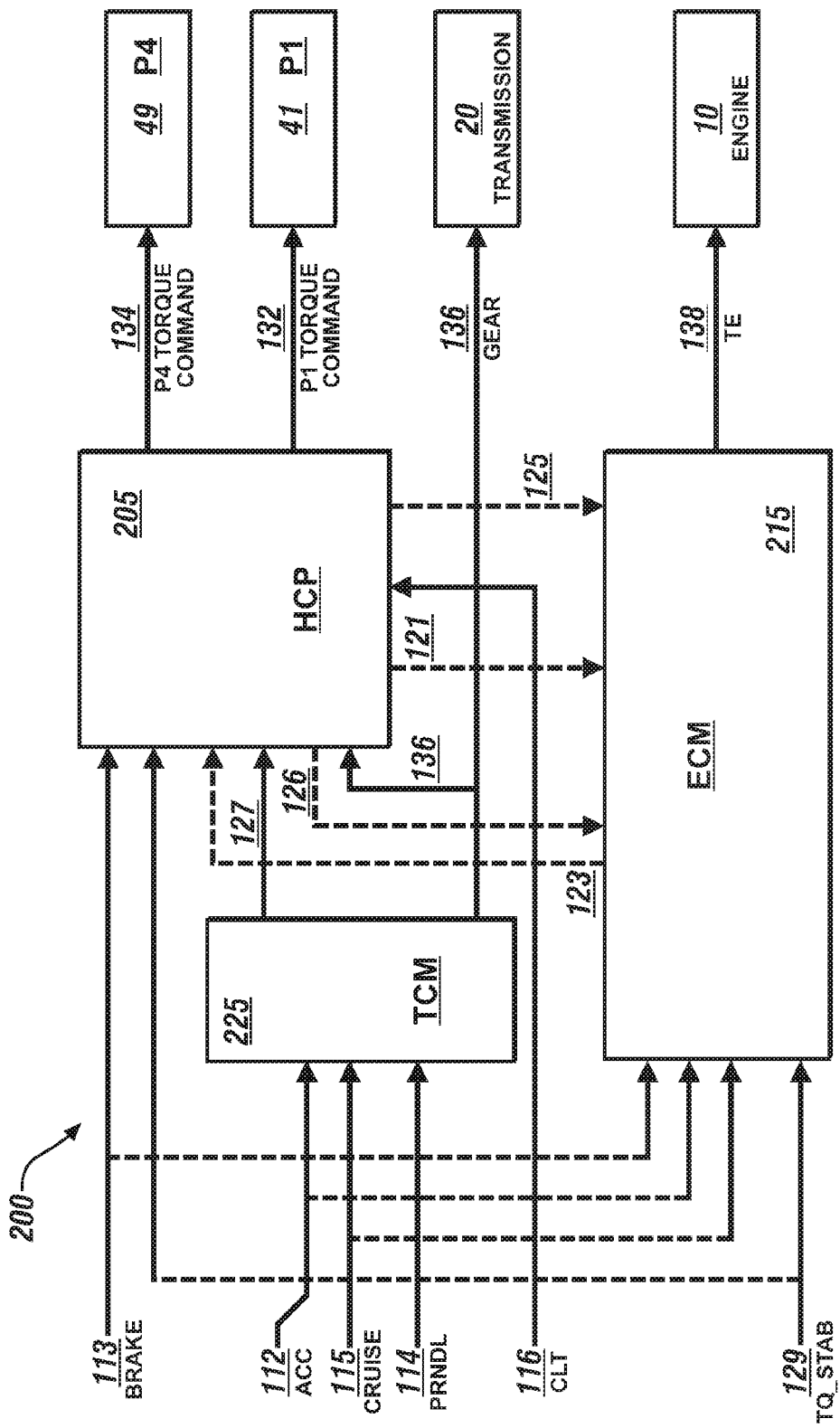
FIG. 2 illustrates an axle torque control architecture configured to control a powertrain system employing an internal combustion engine and non-combustion torque machine(s) arranged in a power-split configuration to transfer torque to a driveline via a passive transmission, in accordance with the disclosure.

FIG. 2 depicts the axle torque control architecture 200 that is configured to control a powertrain system employing an internal combustion engine and non-combustion torque machine(s) arranged in a power-split configuration to transfer torque to a driveline via a passive transmission, e.g., an embodiment of the powertrain system 100 including the passive transmission 20 described with reference to FIG. 1. The axle torque control architecture 200 can be configured to control operation of an embodiment of the powertrain system 100 employing one or more of the torque machine(s) 40, i.e., one of the torque machines 41, 43, 47 and 49 as previously described. The axle torque control architecture 200 is an arrangement of control modules and executable control routines that executes delegated tasks to determine operational commands in the form of engine and torque machine torque commands, transmission gear changes, and torque converter clutch commands to achieve a desired axle torque in response to operator inputs and commands including acceleration, braking, gear selection, cruise control, and clutch pedal position.

The axle torque control architecture 200 includes controllers including HCP 205, ECM 215, and TCM 225 that are configured to generate the operational commands for controlling operation of the torque machines, the internal combustion engine, and the passive transmission of the multi-mode powertrain system. The HCP 205, ECM 215, and TCM 225 are analogous to the HCP 5, ECM 15, and TCM 25, respectively that are described with reference the multi-mode powertrain system 100 of FIG. 1. As described herein, the axle torque control architecture 200 is configured for a vehicle that includes a multi-mode powertrain system including an internal combustion engine that mechanically couples to a single input member of a passive transmission having a single output member, wherein the output member mechanically couples to a primary drive wheel, and non-combustion torque machines that mechanically couple to selected ones of the internal combustion engine, the single input member, the single output member and a secondary drive wheel.

The ECM 215 signally and operatively connects to the internal combustion engine, and includes a control routine for determining and executing engine torque commands responsive to a hybrid engine torque command and a control routine for determining a propulsion axle torque command responsive to an output torque request. The TCM 225 signally and operatively connects to the passive transmission, and includes a control routine for selecting and effecting operation of the passive transmission in a preferred gear responsive to the output torque request. The HCP 205 signally and operatively connects to the non-combustion torque machines, including control routines for determining and executing torque commands for each of the non-combustion torque machines and a control routine for determining the hybrid engine torque command to achieve a desired axle torque in response to the propulsion axle torque command with the passive transmission operating in the preferred gear. As used herein, the term operatively connected is intended to include all connections, including mechanical, electrical, optical or other connections, necessary to enable the operation of the identified element of the multi-mode powertrain system 100 with the identified controller.

The axle torque control architecture 200 can be employed to control embodiments of the powertrain system 100 arranged in power-split configurations, e.g., a P1/P4 system having two or more degrees of freedom in controlling torque output from the powertrain system via propulsion on two axles wherein axle torque is controlled on one of the axles without managing torque through the passive transmission 20. The operational commands include torque commands to the torque machines, including a torque command 132 to the first torque machine P1 41 (P1 torque command) and a torque command 134 to the fourth torque machine P4 49 (P4 torque command). Other operational commands include a transmission gear and torque converter clutch command (GEAR) 136 and an engine torque command (TE) 138. The input signals to the controller 5 include the accelerator pedal command (ACC) 112, brake pedal command (BRAKE) 113, PRNDL/range command (PRNDL) 114, cruise control command (CRUISE) 115, clutch pedal command (CLT) 116, and torque stability control command (TQ_STAB) 129, which includes traction (torque increase), drag (torque decrease), and a front axle/rear axle torque split. Intermediate outputs that are internally communicated between the HCP 205, TCM 225 and ECM 215 include a minimum axle torque limit 121, a propulsion axle torque command 123, a hybrid engine torque command 125, a primary axle torque command 126 and a transmission shift crankshaft torque request 127.

The axle torque control architecture 200 supports the use of gear determination and shift execution for the passive transmission 20, including executing control routine(s) in the TCM 225 to determine a preferred gear and controlling clutch-to-clutch asynchronous shifts in response to an axle torque command and an effective arbitrated accelerator pedal (AEPP) command that takes into account the accelerator pedal command 112 and the cruise control command 115.

The axle torque control architecture 200 is configured for the powertrain system 100 that is arranged in a power-split configuration to transfer torque to the driveline via the passive transmission 20, e.g., the P1/P4 powertrain arrangement that includes the first torque machine P1 41 coupled to the front of the engine and the fourth torque machine P4 49 coupled to secondary drive wheels 94. In one embodiment the fourth torque machine P4 49 couples to secondary drive wheels 94 on a rear drive axle in a front-wheel drive configuration. It is preferred to control operation of the powertrain system to achieve an axle torque because that is the end requirement towards which most functions of the axle torque control architecture 200 are working. Thus, various combinations of non-combustion propulsion devices, i.e., various combinations of the torque machines 41, 43, 47 and 49 can be employed by the axle torque control architecture 200 without redesigning the interface between the ECM 215 and HCP 205.

Figure 3:
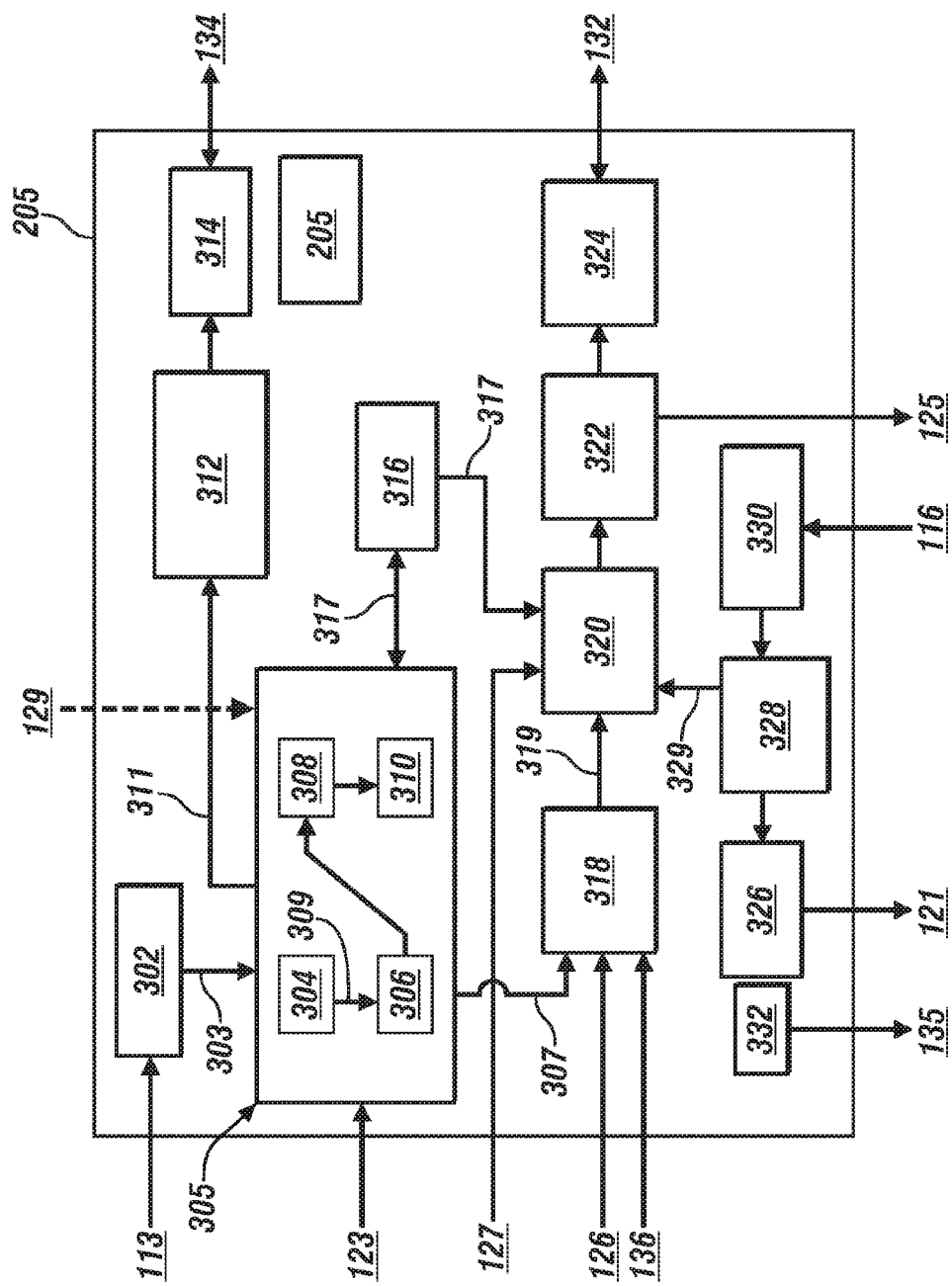
FIG. 3 illustrates an exemplary hybrid control module of an axle torque control architecture, in accordance with the disclosure.

FIG. 3 illustrates an embodiment of the HCP 205 of the axle torque control architecture 200 shown with reference to FIG. 2, including a plurality of control routines employed for calculating and executing the P1 torque command 132 and the P4 torque command 134 in response to inputs including the brake pedal command 113, a propulsion axle torque command 123, a transmission gear and torque converter clutch command 136, torque stability control command 129, which includes traction (torque increase), engine drag torque 135 (torque decrease), and a front axle/rear axle torque split, and clutch pedal command 116. The brake pedal command 113 is employed in a regenerative brake torque determination routine 302 to determine a regenerative brake torque command 303. The regenerative brake torque command 303, the propulsion axle torque command 123 and the torque stability control command 129 are input to an axle torque routine 305, which includes control routines including an axle torque sum routine 304 to determine a total desired axle torque 309 that is subjected to an axle torque shape routine 306, an axle torque split routine 308 and a traction control routine 310. The axle torque shape routine 306 evaluates powertrain and driveline operation to determine driveline lash and to determine a preferred axle torque command 307 that minimizes or avoids driveline clunk that may occur during a torque reversal. The axle torque routine 305 evaluates and arbitrates between the various routines to determine a raw P4 axle torque command 311 that is subjected to arbitration through a P4 axle torque arbitration routine 312, which is output to a P4 torque control routine 314 for implementation as the P4 torque command 134. On embodiments in which a fourth torque machine P4 49 is not employed or is not presently available for use, all of the preferred axle torque command 307 is transferred to the primary drive wheels 92 via the driveline 90.

An engine autostop/autostart control routine 316 provides an output of an engine autostop/autostart command 317. An axle torque to crank torque conversion routine 318 combines a primary axle torque command 126 with the preferred axle torque shape command 307 and the transmission gear and torque converter clutch command 136 to determine a crankshaft torque command 319, which is combined with an engine idle torque 329 and an engine autostop/autostart command 317 and subjected to a crankshaft torque arbitration routine 320 to determine a crankshaft torque, which is split by a crankshaft torque split routine 322. The crankshaft torque split routine 322 determines a hybrid engine torque command 125 and a corresponding P1 torque command that is output to a P1 torque control return 324 for implementation as the P1 torque command 132.

As such, the routines executed by the HCP 205 determine hybrid engine torque command 125, the P1 torque command 132, and the P4 torque command 134. In addition, the clutch pedal command 116 is monitored on systems so equipped to monitor manual transmission launch control 330, which is employed by engine idle speed control 328 for controlling engine idle speed. The engine idle speed is used by a minimum axle torque routine 326 to determine the minimum axle torque limit 121. An engine drag routine 332 determines the engine drag torque 135 based upon present engine operating conditions.

Figure 4:
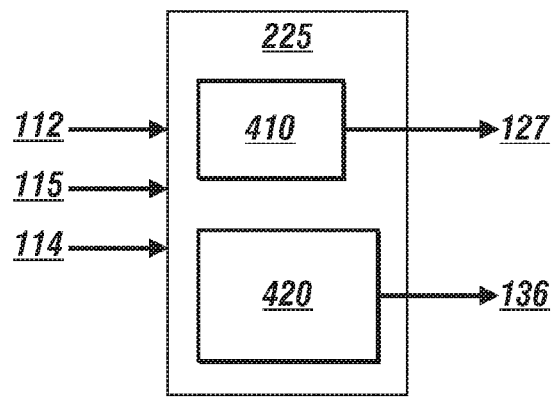
FIG. 4 illustrates an exemplary transmission control module of an axle torque control architecture, in accordance with the disclosure.

FIG. 4 illustrates an exemplary TCM 225 of the axle torque control architecture 200 of FIG. 2, including a plurality of control routines employed for calculating and executing the transmission gear and torque converter clutch command 136 in response to the accelerator pedal command 112, transmission range command 114, vehicle speed cruise control command 115 and transmission shift crankshaft torque request 127. The TCM 225 includes a crankshaft asynchronous shift execution control routine 410 that employs the accelerator pedal command 112, the transmission range command 114 and the vehicle speed cruise control command 115 to determine the transmission shift crankshaft torque request 127. The TCM 225 includes an axle torque-based gear determination control routine 420 that employs the accelerator pedal command 112, the transmission range command 114 and the vehicle speed cruise control command 115 to select and effect operation of the passive transmission in a preferred gear responsive thereto as part the transmission gear and torque converter clutch command 136. The TCM 225 commands and controls the passive transmission to operate in the selected transmission gear, including executing a gear shift to the preferred transmission gear using a control routine in response to the transmission gear and torque converter clutch command 136.

Figure 5:
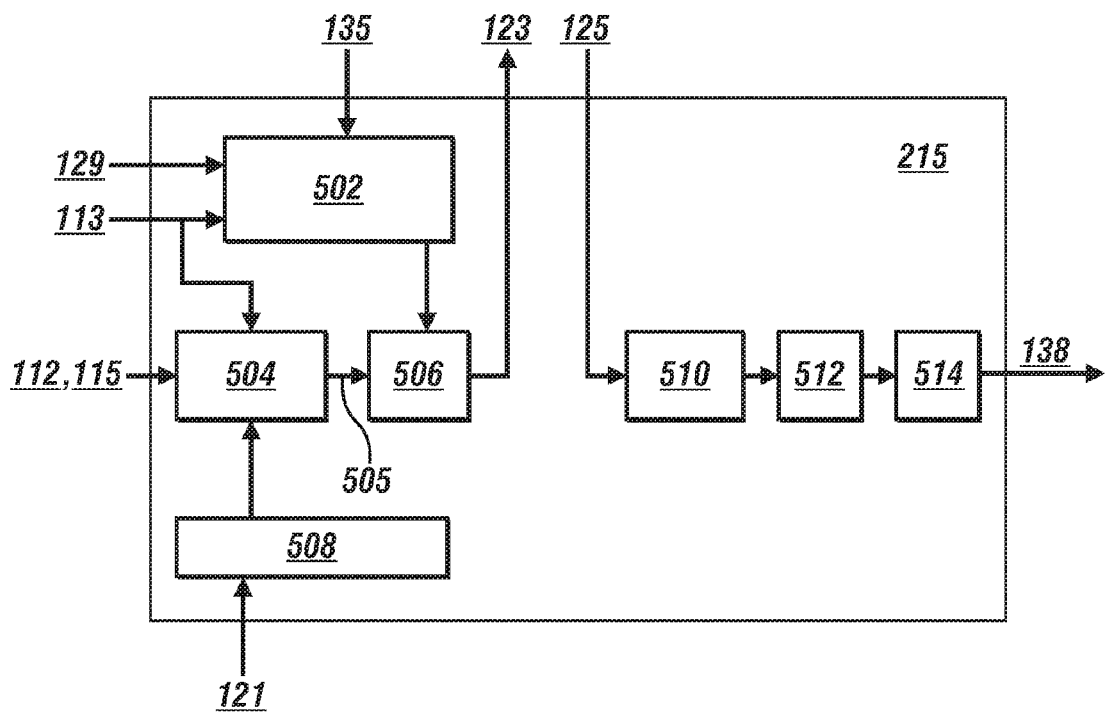
FIG. 5 illustrates an exemplary engine control module of an axle torque control architecture, in accordance with the disclosure.

FIG. 5 illustrates an exemplary ECM 215 of the axle torque control architecture 200 of FIG. 2, including a plurality of control routines employed for calculating and executing engine torque control including the engine torque commands 138, which are determined in response to the hybrid engine torque command 125. The hybrid engine torque command 125 is subjected to an engine torque arbitration routine 510, the output of which is supplemented in a mechanical load routine 512 to add mechanical load(s), e.g., air conditioning or hydraulic pump load, which is provided to an engine torque control routine 514 to generate the engine torque commands 138 to execute engine torque control.

The brake pedal command 113, engine drag torque 135 and torque stability control command 129 are input to an axle torque intervention routine 502 for evaluating a need for and implementing axle torque interventions related to stability control, overspeed protection, electric pedal override and other related stability controls, the output of which is provided to an axle torque-based pedal interpretation routine 504. A zero pedal torque determination routine 508 monitors minimum axle torque limit 121, and the output is provided to the axle torque-based pedal interpretation routine 504.

The axle torque-based pedal interpretation routine 504 monitors the accelerator pedal command 112, brake pedal command 113, vehicle speed cruise control command 115 and the outputs from the axle torque intervention routine 502 and the axle torque-based pedal interpretation routine 504 to determine an axle torque command 505, which is subjected to an axle torque arbitration routine 506 and provided to calculate the propulsion axle torque command 123. Thus, the propulsion axle torque command 123 is determined in response to the accelerator pedal command 112, brake pedal command 113, vehicle speed cruise control command 115, minimum axle torque limit 121, and torque stability control command 129, which includes traction (torque increase) and drag (torque decrease).

Thus, in operation the ECM 215 performs axle torque-based pedal interpretation and axle torque-based intervention arbitration. The ECM 215 sends the propulsion axle torque command 123 to the HCP 205. The HCP 205 combines this with an axle torque brake regeneration request to find a total desired axle torque. It then uses stability control and efficiency information to determine a torque split ratio for the total axle torque to the front and rear axles. If the P4 torque machine is not employed, then all of the propulsion torque goes to the single axle coupled to the driveline. The HCP 205 shapes the axle torque request for clunk zone mitigation independently. The HCP 205 converts the front axle torque to crankshaft torque and performs crankshaft torque arbitration with engine autostart and autostop controls, transmission shift controls and idle speed controls. In a configuration that does not employ the fourth torque machine P4 49, the TCM 225 determines a preferred gear ratio from the AEPP command or the axle torque command from the ECM 215 or HCP 205. In a configuration employing the fourth torque machine P4 49, the TCM 225 determines the ratio from the axle torque command from the HCP 205. The HCP 205 performs engine idle control. A minimum axle torque is sent from the HCP 205 to the ECM 215 to communicate regeneration limitations and stall prevention limitations. This is used for idle speed control with the torque converter clutch open. The HCP 205 uses the arbitrated crankshaft torque request and determines a preferred engine torque and a preferred P1 motor torque. The HCP 205 sends the preferred engine torque to the ECM 215 for implementation. The HCP 205 controls the P4 motor torque according to the axle torque requests and controls the P1 motor torque in response to the crankshaft torque request while accounting for engine torque delivery.

Torque request operations include an operator torque request via the acceleration and brake pedals, cruise control, traction/drag control, vehicle and engine overspeed protection, brake torque management, dFCO, engine idle speed control, transmission torque demands, brake torque management, transmission, clutch fuel cutoff, hybrid torque request, e.g., for battery charging, theft deterrent, air conditioner compressor operation, catalyst light-off, engine startability management, and green engine mode operation, amongst others.

In one embodiment of a control process, the ECM 215 performs axle torque-based interpretation of the operator commands via the accelerator pedal command 112 and the brake pedal command 113 and the axle torque intervention routine 502, and sends the resultant propulsion axle torque command 123 to the HCP 205. The HCP 205 at sum routine 304 sums the propulsion axle torque command 123 with the regenerative brake torque command 303 and the torque stability control command 129 to determine a total desired axle torque 309 that is subjected to an axle torque shape routine 306, an axle torque split routine 308 and a traction control routine 310 to determine a preferred axle torque split. The preferred axle torque split is a ratio indicating the relative amounts of the total axle torque that are deployed through the front and rear axles. The HCP 205 shapes the total desired axle torque 309 for clunk zone mitigation independently. The HCP 205 converts the axle torque command for the primary drive wheels 92 to a crankshaft torque and performs crankshaft torque arbitration, taking into account engine start/stop operation, transmission shift controls and engine idle controls. The TCM 225 determines the transmission gear and torque converter clutch command 136 from the effective arbitrated accelerator pedal (AEPP). Alternatively, the TCM 225 determines the transmission gear and the torque converter clutch command 136 from an axle torque request from the HCP 205. The HCP 205 performs engine idle speed control 328 for controlling engine idle speed. A minimum axle torque limit 121 is sent from the HCP 205 to the ECM 215 to communicate regenerative braking limitations and stall prevention limitations, which can be employed for engine idle control with the torque converter open. The HCP 205 employs the arbitrated crankshaft torque request and determines an optimal engine torque and P1 Motor torque, including the HCP 205 sending the hybrid engine torque command 125 to the ECM 215 for actuation in the form of the engine torque commands 138. The HCP 205 controls the non-combustion torque machine(s) 40 responsive to the axle torque requests and the engine torque delivery.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control architecture for a vehicle comprising a multi-mode powertrain system including an internal combustion engine mechanically coupled to a single input member of a passive transmission having a single output member, the architecture comprising:
   a primary drive wheel, exclusively driven via a mechanical coupling to the single output member;
   a first non-combustion torque machine mechanically coupled to one of the internal combustion engine, the single input member, and the single output member;
   a secondary drive wheel exclusively driven via a mechanical coupling to a second non-combustion torque machine;
   an engine controller operatively connected to the internal combustion engine, including a control routine for determining and executing engine torque commands responsive to a hybrid engine torque command, and a control routine for determining a propulsion axle torque command responsive to an output torque request;
   a transmission controller operatively connected to the passive transmission, including a control routine for selecting and effecting operation of the passive transmission in a preferred gear responsive to the output torque request; and
   a hybrid controller operatively connected to the non-combustion torque machines, including
      a control routine for determining an axle torque split between the primary drive wheel and the secondary drive wheel responsive to the propulsion axle torque command and comprising a primary axle torque command and a secondary axle torque command,
      a control routine for determining a crankshaft torque command in response to the primary axle torque command and the preferred gear of the passive transmission, a control routine for subjecting the crankshaft torque command to a crankshaft torque split between the engine and the first non-combustion torque machine, a control routine for determining the hybrid engine torque command responsive to the crankshaft torque split, a control routine for controlling the first non-combustion torque machine responsive to the crankshaft torque split, and a control routine for controlling the second non-combustion torque machine responsive to the secondary axle torque command.

2. The control architecture of claim 1, wherein the first non-combustion torque machine is mechanically coupled to a crankshaft of the internal combustion engine.

3. The control architecture of claim 1, wherein the first non-combustion torque machine is mechanically coupled to the single input member of the passive transmission.

4. The control architecture of claim 1, further comprising a control routine to subject the crankshaft torque to crankshaft torque arbitration, taking into account engine start/stop operation, transmission shift control and engine idle control.

5. The control architecture of claim 1, wherein the hybrid controller further includes a minimum axle torque routine to determine a minimum axle torque limit that is sent to the engine controller to communicate regenerative braking limitations and stall prevention limitations.

6. The control architecture of claim 1, wherein the first non-combustion torque machine is mechanically coupled to the internal combustion engine.

\* \* \* \* \*